United States Patent [19]
Nail

[11] Patent Number: 5,758,340
[45] Date of Patent: May 26, 1998

[54] SYSTEM AND METHOD FOR CONTROLLED, MULTI-TIERED SUBSETTING OF A DATA MODEL

[75] Inventor: Jill Nail, Plano, Tex.

[73] Assignee: Sterling Software, Inc., Dallas, Tex.

[21] Appl. No.: 782,550

[22] Filed: Jan. 10, 1997

Related U.S. Application Data

[63] Continuation of Ser. No. 298,688, Aug. 31, 1994, abandoned.

[51] Int. Cl.$^6$ .................................................. G06F 17/30
[52] U.S. Cl. .............................. 707/9; 707/203; 395/712; 364/286.4; 364/969; 364/974.6
[58] Field of Search ................ 395/712; 364/286.4, 364/969, 969.1, 969.2, 969.3, 974.6; 707/9, 203

[56] References Cited

U.S. PATENT DOCUMENTS

| | | | |
|---|---|---|---|
| 4,558,413 | 12/1985 | Schmidt et al. | 364/300 |
| 4,774,661 | 9/1988 | Kumpati | 364/300 |
| 4,853,843 | 8/1989 | Ecklund | 364/200 |
| 5,295,222 | 3/1994 | Wadhwa et al. | 395/1 |
| 5,339,435 | 8/1994 | Lubkin et al. | 395/700 |
| 5,386,559 | 1/1995 | Eisenberg et al. | 395/600 |

OTHER PUBLICATIONS

"Information Engineering Facility Methodology Overview", 1989 Texas Instruments Incorporated, pp. 16, 17, 28, 34, 35, 39, and 41.

Mahler, a, "Shape—A Software Configuration Management Tool", International Workshop on Software Version and Configuration Control, Sep. 1987 pp. 1–11.

Korn, D., "The 3–d File System", USENIX—Summer '89, pp. 147–156.

*Primary Examiner*—James P. Trammell
*Assistant Examiner*—Michael T. Richey
*Attorney, Agent, or Firm*—Baker & Botts, L.L.P.

[57] ABSTRACT

The present invention is a data processing system and method for providing controlled, multi-tiered checkout of a subset of a first data model storage (111) to a second data model storage (111). The present invention include a checkout module (107) responsive to a user checkout request and a first protection level associated with the first data model storage (111) for generating a subset of the first data model storage (111), for generating a second protection level associated with the subset, for updating the first protection level in accordance with the second protection level, and for updating a second data model storage (111) with the subset and the second protection level associated with the subset. The present invention also includes a data manager (108) for managing the subsetted data in accordance with the second protection level. Also included in the present invention is an update module (109) responsive to an update request for updating the first data model storage (111), using a transactions data storage (113), in accordance with the modifications made to the subsetted data using the data manager (108).

12 Claims, 2 Drawing Sheets

SYSTEM AND METHOD FOR CONTROLLED, MULTI-TIERED SUBSETTING OF A DATA MODEL

This application is a Continuation of application Ser. No. 08/298,688, filed Aug. 31, 1994, now abandoned.

TECHNICAL FIELD OF THE INVENTION

This invention relates generally to computer automated systems engineering (CASE) tools and in particular, to a system and method for controlled, multi-tiered subsetting of a data model.

BACKGROUND OF THE INVENTION

CASE tools, in general, are a collection of programs, data files, data structures, etc. which facilitate the creation of software applications. CASE tools are useful in that a user can create applications from diagrams instead of from code. In large scale environments, such as mainframe environments or network environments, where a large number of people simultaneously work on, or are responsible for, a large project, CASE tools also provide the necessary coordination and control. An example of a CASE tool is the Information Engineering Facility (IEF), a product of the assignee, Texas Instruments, Incorporated.

Included in most CASE tools is a configuration management system through which a user can check out and check in portions of the managed data. Configuration management systems allow multiple users to create a copy of the managed data, make changes to the copied data, and then update the original data with those changes. However, the technique used by some configuration management systems for allowing multiple users to modify the same data generally does not include mechanisms to control the level and type of modifications each user can make. All users are generally given complete control over the data requested. Thus, several users may add, delete and modify the same data simultaneously and, in most cases, with little or no notification of these changes given to the other users.

A second problem with most configuration management systems is data inconsistency. Suppose, for example, the configuration management system manages two data objects, program A and program B. Additionally, suppose program A includes a subroutine call to program B using parameters W, X, Y and Z. In most configuration management systems, one user can modify program B to instead require parameters W, X and Y without making corresponding changes to program A. The result is inconsistent data. The parameters sent by program A when making the subroutine call to program B do not agree with the parameters program B has now been modified to receive.

One solution to the problem of data inconsistency is to define dependencies or relationships between the data. However, even if dependencies or relationships are defined between the data, most configuration management systems do not include the mechanisms necessary to use these dependencies to control data access and data modification.

In configuration management systems which allows multiple users to simultaneously change the same data, two or more versions of the data are created. Eventually, however, in order to reduce data inconsistency and maintain data integrity, one set of changes must be applied to the other set of changes. The complexity of this merger process increases as the number of users and the number of changes to the same data increase. In this environment, data inconsistency problems are not easily resolved thus limiting the use of automated merging techniques.

Another limitation with most configuration management systems is that they are generally designed to operate independently in one environment or on one platform. Two or more environments or platforms which include the same configuration management system are generally unable to share data without relinquishing control over that data. In most instances, only a simple import/export of the data between systems is performed. This limitation is particularly restricting in distributed processing systems where data is transferred to other systems but, there is a need to maintain some level of centralized control over the data.

What is needed is a system and method which facilitate controlled, multi-tiered data sharing between one or more systems which provides protection against the occurrence of inconsistent, out-of-sync data.

SUMMARY OF THE INVENTION

The present invention facilitates controlled, multi-tiered data sharing between one or more systems and further provides protection against the occurrence of inconsistent, out-of-sync data.

In one embodiment of the instant invention, a user on a requesting system can checkout a subset of data stored on a parent system by issuing a checkout request to the parent system. The checkout request not only identifies the data requested from the parent system, but also includes a requested protection level at which to checkout the requested data.

In response to the checkout request, a checkout module on the parent system determines the data to be subsetted from the parent system, which may include more than the requested data, subsets the data, then determines a second protection level to grant to the requesting system on the subsetted data. The second protection level is determined in accordance with a first protection level associated with the subsetted data on the parent system and the requested protection level included in the checkout request from the requesting system.

The first protection level associated with the subsetted data on the parent system is updated in accordance with the second protection level granted to the requesting system and then the subsetted data and the second protection level are copied to the requesting system.

In another embodiment of the present invention, the parent system and the requesting system are physically the same system, i.e., the parent system subsets its own data in response to a checkout request issued through the parent system.

BRIEF DESCRIPTION OF THE DRAWINGS

For a better understanding of the present invention, reference may be made to the accompanying drawings, in which.

DETAILED DESCRIPTION OF THE INVENTION

The present invention facilitates controlled multi-tiered data sharing between a plurality of users wherein the occurrence of inconsistent, or "out-of-sync" data is minimized. The present invention minimizes data inconsistency by preventing multiple users from acquiring access to the same data. The present invention instead generates subsets or tiers of access between successive users. Each subset or tier includes a protection level associated with the subsetted data which is based upon the protection level retained from previous subsets or tiers including the same data. The protection level on the subsetted data determines the type of modifications the user can make on the subsetted data.

The present invention further minimizes "out-of-sync" data by subsetting the data in accordance with subset expansion rules. Through the subset expansion rules, a parent system controls the data included in a subset issued to another system so that all related data must also be included when a particular data item is requested. Thus, through controlled, multi-tiered subsetting, the parent system retains control and ownership of data released to the requesting system.

Figure 1:
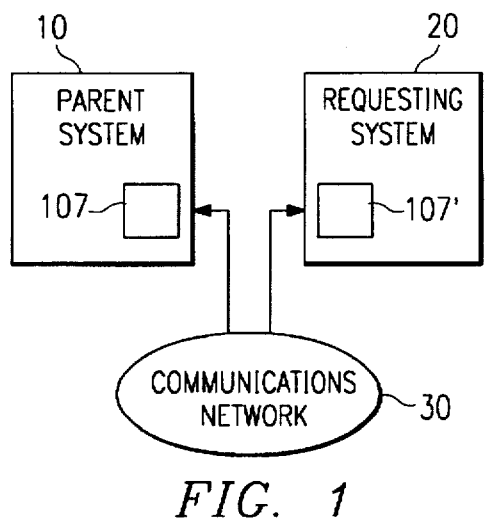
FIG. 1 is a generalized block diagram of one embodiment of the system of the present invention.

One embodiment of the present invention is implemented as shown in FIG. 1. FIG. 1 illustrates a parent system 10 coupled to a requesting system 20 through a network 30. In this embodiment of the present invention, both the parent system 10 and the requesting system 20 are general purpose digital computers which include a checkout module 107 and 107', respectively. The checkout modules 107 and 107' facilitate access by the requesting system 20 to data stored on the parent system 10 and access by the parent system 10 to data stored on the requesting system 20 as further described hereinbelow.

Figure 2:
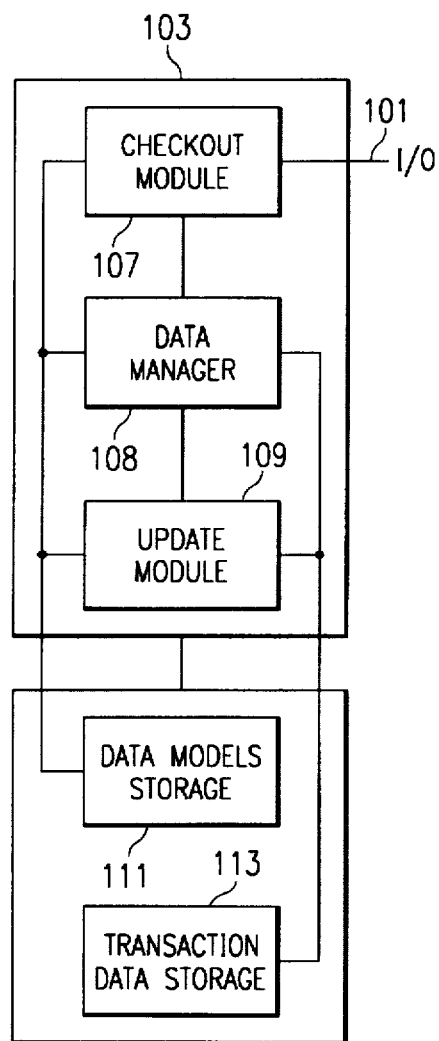
FIG. 2 is a block diagram illustrating another embodiment of the system of the present invention.

Both the parent system 10 and the requesting system 20 are configured as shown in FIG. 2. FIG. 2 illustrates a processor 103 and data storage 105. Included in the processor 103 is a checkout module 107, a data manager 108 and an update module 109. Included in data storage 105 are a data model storage 111 and a transactions data storage 113.

The checkout module 107 processes requests from the user to checkout portions of the data model storage 111 stored in data storage 105. Data manager 108 is a database management system which controls and processes all user requests on the data stored in the data model storage 111. The update module 109 updates the data model storage 111 on the parent system 10 in accordance with modifications made through the data manager 108.

Figure 3:
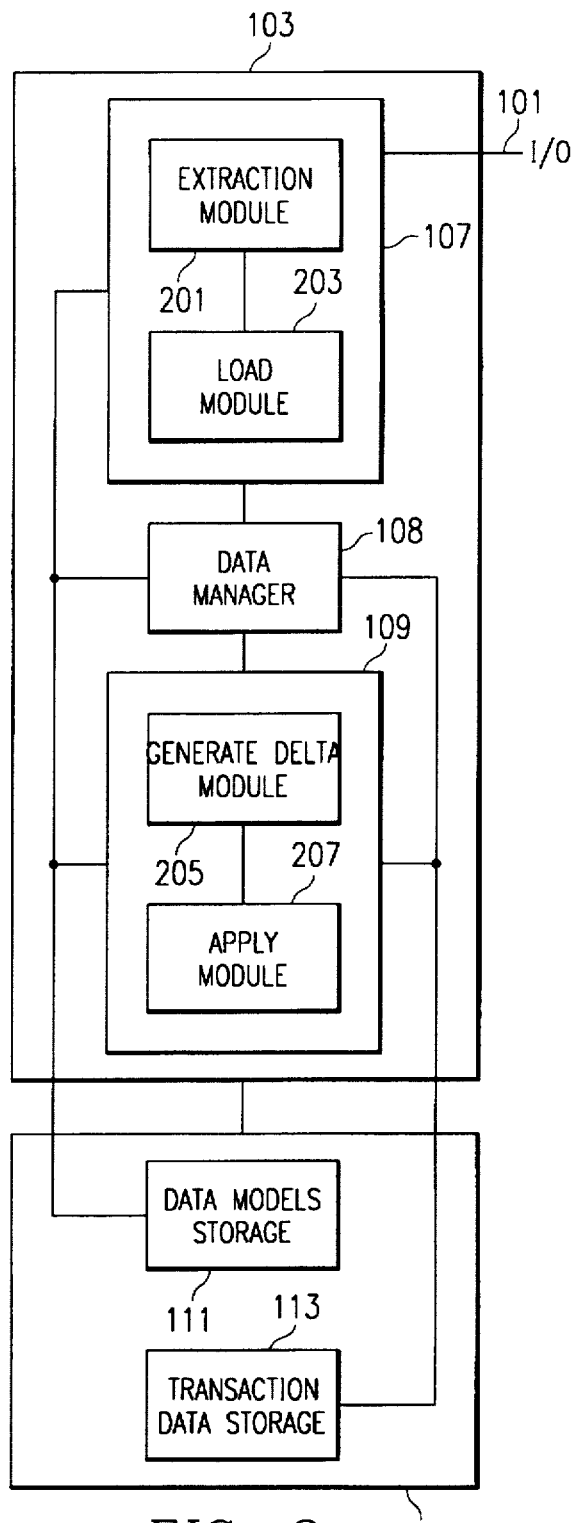
FIG. 3 is a more detailed block diagram of the embodiment of the present invention illustrated in FIG. 2.

FIG. 3 further illustrates in more detail the embodiment of the system of the present invention shown in FIG. 2. FIG. 3 shows that the checkout module 107 includes an extraction module 201 and a load module 203. Also shown in FIG. 3 are a generate delta module 205 and an apply module 207 which comprise the update module 109 shown in FIGS. 1 and 2.

In the embodiment of the present invention shown in FIGS. 1 and 2, the data manager 108 and the data model storage 111 are implemented in the Information Engineering Facility (IEF), a set of products of the assignee, Texas Instruments, Incorporated. IEF is a set of CASE tools which automates the entire information systems life cycle from planning through analysis, design, code generation and maintenance. Two of the products included in the IEF are the IEF Client/Server Encyclopedia and the IEF Workstation Toolset.

The IEF Client/Server Encyclopedia is a comprehensive, multi-user database and set of tools that manages all information needed to construct and document business systems. This information is represented in the IEF Client/Server Encyclopedia as IEF data models.

An IEF data model is a collection of information which describes how an enterprise operates and what its system needs are. These models are represented in the IEF Client/Server Encyclopedia as objects, properties of objects and associations between objects.

In the IEF Client/Server Encyclopedia, an object represents a single data item or data entity such as, in a database system, a table or a field, or, in a software application, a program module. Properties of objects are data items which further define an object. For example, properties of the object "field" include a field name, a field length and a field type. Associations between objects define logical connections between two or more objects. For example, an association between one program module and another program module is that the first program module is called by the second program module. An object "table" can also be associated with an object "field" to indicate that the field is included in the table. Whether data is implemented as an object, a property of an object or an association between objects depends upon the particular application.

The IEF Workstation Toolset is a collection of programs and data files which allow a user on a single user workstation to edit the contents of IEF data models downloaded from an IEF Client/Server Encyclopedia and stored locally.

Under the system and method of the present invention, IEF users can checkout subsets of IEF data models either to another IEF Client/Server Encyclopedia or to a single user system operating under the IEF Workstation Toolset. Using the system and method of the present invention, IEF users can also further divide a subset and thus modify different sections of a previously subsetted portion of an IEF data model.

The system and method of the present invention is initiated when a checkout request is received from the user. Checkout module 107, in response to the checkout request, extracts the requested data from the data model storage 111 and transfers a copy of the subset of the data model storage 111 including the requested data from the IEF Client/Server Encyclopedia to the requesting system 20 using transactions data storage 113. The checkout module 107 on the requesting system 20 then loads the data from the transactions data storage 113 into the data model storage 111 on the requesting system 20.

The subset of data model storage 111 transferred to the requesting system 20 can be further subdivided into smaller subsets and checked out to an IEF Workstation Toolset, the same IEF Client/Server Encyclopedia or to a different IEF Client/Server Encyclopedia.

Thus, using the system and method of the present invention, a subset of the data model storage 111 can be extracted from one IEF Client/Server Encyclopedia and loaded into the data model storage 111 of another IEF Client/Server Encyclopedia. This new subset in the data model storage 111 on the requesting system 20 can be further subsetted to the data model storage 111 of a third IEF Client/Server Encyclopedia or of an IEF Workstation Toolset.

The subsetted data in the data model storage 111 on the requesting system 20 includes an associated protection level granted from the parent system 10 which is used by the data manager 108 on the requesting system 20 to control modifications to the subsetted data. The data model storage 111 on the requesting system 20 also includes the information necessary to send updates to the data model storage 111 on the parent system 10.

The data model storage 111 on the parent system 10 includes information indicating that a particular subset is checked out, thus enabling the parent system 10 to receive modifications to the subset from the requesting system 20 upon request from a user on the requesting system 20. The information is stored as fields or as flags in the data model storage 111. The data model storage 111 on the parent system 10 further includes a protection level associated with the checked out subset which prevents the checkout module 107 on the parent system 10 from granting conflicting access to the data included in that subset to another system.

The requesting system 20 keeps track of changes to data included in a received subset. These changes are sent to the IEF Client/Server Encyclopedia on the parent system 10 when a user of the IEF Client/Server Encyclopedia on the requesting system 20 issues an update request to update the data model storage 111 on the parent system 10. Once the update of the data model storage 111 on the parent system 10 is complete, change status flags within the data model storage 111 on the requesting system 20 are reset to allow a subsequent update.

Using the present invention, IEF projects are better managed by subsetting models and subsets into smaller portions. Both the IEF Client/Server Encyclopedia and the IEF Workstation Toolset implementations keep track of changes made to data in the data model storage 111. The IEF Client/Server Encyclopedia implementation requires less space than the IEF Workstation Toolset implementation in that the IEF Client/Server Encyclopedia records changes using change status flags stored in the data model storage 111. The IEF Workstation Toolset implementation requires more space in that it records changes by storing records in the transactions data storage 113, thereby having the capability to include duplicate transactions whereas the IEF Client/Server Encyclopedia implementation cannot.

Using the present invention, IEF projects are also better managed in that the present invention prevents two users or two projects from simultaneously modifying the same data. The current checkout process also supports the concept of downgrading, where data is checked out with less protection than is requested. Thus, even if the user cannot modify the subsetted data, the user may nonetheless have access to the data. The checkout of a multi-tiered subset has to take into account the protection that was received when the subset of the data model storage 111 was checked out from the parent system 10. Therefore, a subsequent checkout of the subsetted data from the requesting system 20 to a second requesting system, not shown, can include no more than access protection since that is all that the first requesting system 20 had. Thus, the present invention allows multi-tiered, controlled updating of shared data and supports distributed computing (downsizing) without loss of control.

One embodiment of the system of the present invention includes the parent system 10 which includes the data model storage 111 implemented using IEF Client/Server Encyclopedia and the requesting system 20 which also includes the data model storage 111 implemented using IEF Client/Server Encyclopedia.

Figure 4:
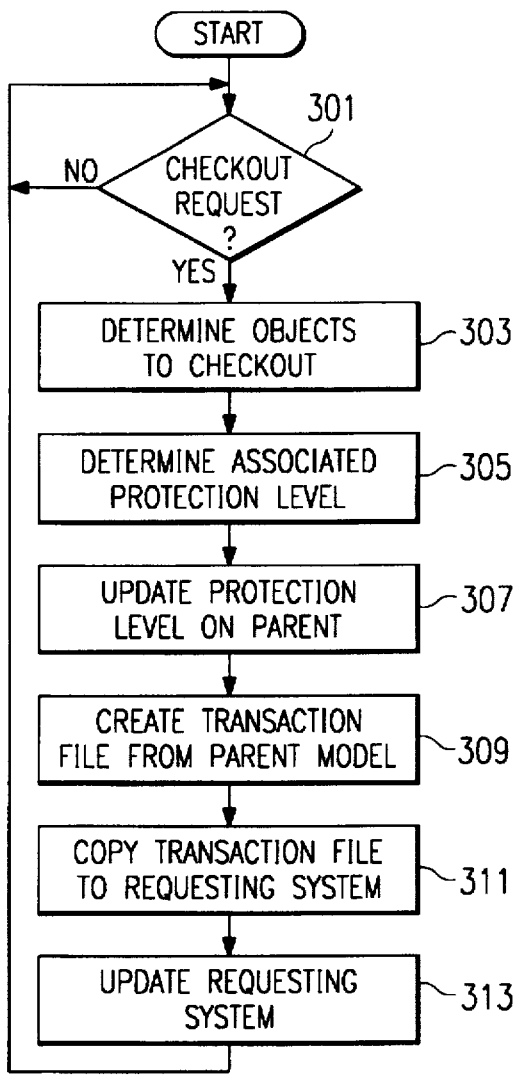
FIG. 4 is a flowchart illustrating the general operation of the checkout module shown in FIGS. 2 and 3 of the present invention.

In this embodiment of the present invention, the parent system 10 receives the checkout requests from the requesting system 20 identifying data to be subsetted from the data model storage 111 on the parent system 10. These checkout requests are processed by checkout module 107 on the parent system 10. The flowchart in FIG. 4 illustrates generally the operation of checkout module 107. As shown at decision block 301 in FIG. 4, upon receipt of the checkout request, the extraction module 201 of the checkout module 107, as shown at block 303 determines the data to be included in the subset from the data model storage 111 on the parent system 10 and checked out to the requesting system 20.

Extraction module 201 determines the data to be subsetted from the data model storage 111 on the parent system 10 using a set of subset expansion rules. The subset expansion rules determine what data from the data model storage 111 on the parent system 10 to include in the subset based upon associations or relationships to other data defined by the user and stored in the data model storage 111 on the parent system 10. If, for example, a particular data object was requested from the data model storage 111 on the parent system 10 and that data object was related to another data object, then the subset expansion rules may require that both data objects be included in the subsetted data extracted from the data model storage 111 on the parent system 10.

The subset expansion rules are determined in relation to the particular implementation of the data model storage 111. In the implementation of the data model storage 111 using IEF Client/Server Encyclopedia, for example, associations between data objects are classified as either mandatory or optional and within the association, one or more objects may be designated as required for that association. Thus, in general, a mandatory association from a first data object to a required data object results in subset expansion rules which require that the required data object be included when a checkout request including the first data object is received.

The checkout request from the requesting system 20 also includes a requested protection level. The protection level identifies the type of access requested on the subsetted data. The protection levels available include delete, modify, access and read.

The delete protection level permits the requesting system 20 to delete the subsetted data. Delete protection is granted only when delete, modify or access protection has not previously been granted to another system and when all associated objects are also included in the subset.

The modify protection level permits the requesting system 20 to modify the subsetted data. Modify protection is granted only when no other system has previously been granted either delete protection or modify protection.

The access protection level permits the requesting system 20 to reference the subsetted data. Access protection is granted only when no other system has previously been granted delete protection.

The read protection level permits the requesting system 20 to read the subsetted data. Read protection is the lowest protection level available. With read protection, the requesting system 20 cannot delete, modify or reference the subsetted data.

Although the requesting system 20 includes a protection level in the checkout request, the actual protection level associated with the subsetted data is determined, as shown at block 305 in FIG. 4, by the extraction module 201 of the checkout module 103 on the parent system 10 based on the protection level that the parent system 10 has on the requested data. The parent system 10 may downgrade the protection level requested when either the checkout request does not include all necessary or referenced data (and the deficiency could not be corrected using the subset expansion rules discussed supra) or another system has previously checked out the requested data with a protection level which precludes authorization to the requesting system 20 at the requested level.

For example, if the parent system 10 has access protection on the data to be included in the subset and the checkout request from the requesting system 20 includes a request for delete protection, then the parent system 10 cannot grant delete protection. The parent system 10 downgrades the requested protection level to access protection. The protection level downgrades, in general, from delete to modify to access to read.

Once the extraction module 201 determines what protection level to grant on the subsetted data, the protection level associated with the subset on the parent system 10, as shown in block 307, is updated in accordance with the protection level granted to the requesting system 20. The associated protection level on the parent system 10 is updated so that the extraction module 201 on the parent system 10 will not grant a conflicting protection level to a subsequent subset which includes all or part of the same data.

In the above example where the parent system 10 had access protection and the requested protection level was delete protection which was downgraded to access protection, the protection level on the parent system 10 is not updated because delete protection has not been given to any other system. Once the associated protection level on the parent system 10 is updated, as shown at block 309 in FIG. 4, the extraction module 201 on the parent system 10 then copies the subsetted data to the transactions data storage 113 on the parent system 10 and, as shown at block 311 copies the transactions data storage 113 on the parent system 10 to the requesting system 20. The load module 201 on the requesting system 20, as shown at block 313, then updates the data model storage 111 on the requesting system 20 with the subsetted data from the transactions data storage 113 on the requesting system 20.

Data copied to the data model storage 111 on the requesting system 20 is then accessed by users of the requesting system 20 through the data manager 108 on the requesting system 20. The data manager 108 controls or manages that access to the subsetted data in accordance with the associated protection level granted from the parent system 10.

If the data manager 108 on the requesting system 20 is a single user system, i.e., the IEF Workstation Toolset, each change made to the subsetted data in the data model storage 111 on the requesting system 20 is also logged to the transactions data storage 113 on the requesting system 20 by the data manager 108 on the requesting system 20. If the data manager 108 on the requesting system 20 is a multi-user system, i.e., the IEF Client/Server Encyclopedia, any changes made to the subsetted data in the data model storage 111 on the requesting system 20 are also indicated by updating the change status flags associated with the subsetted data and included in the data model storage 111 on the requesting system 20.

In order to update the parent system 10, the user of the requesting system 20 makes an update request through the data manager 108 on the requesting system 20. Update requests are processed by the update module 109 on the requesting system 20 which includes the generate delta module 205 and the apply module 207.

Figure 5:
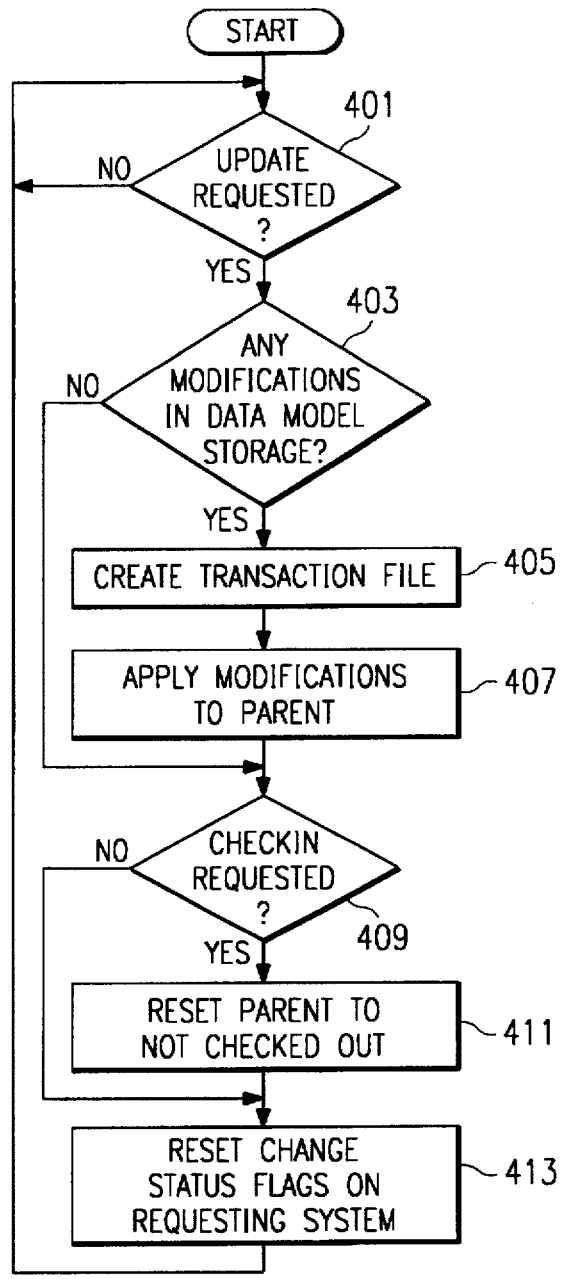
FIG. 5 shows a flowchart illustrating the general operation of the update module shown in FIGS. 2 and 3 of the present invention.

FIG. 5 illustrates the operations of the update module 109 of the present invention. As shown in decision block 401 of FIG. 5, upon receipt of an update request from a user of the requesting system 20, generate delta module 205 checks, at decision block 403 in FIG. 5, for modifications made to the subsetted data on the requesting system 20. If the data manager 108 on the requesting system 20 is a single user system, i.e., one using the IEF Workstation Toolset, then the modifications made to the subsetted data are stored as records or entries in the transactions data storage 113 on the requesting system 20 by the data manager 108 on the requesting system 20.

If the data manager 108 on the requesting system 20 is a multi-user system, i.e., one using the IEF Client/Server Encyclopedia, then the modifications made to the subsetted data are indicated by the change status flags associated with the subsetted data in the data model storage 111 on the requesting system 20. Thus, on a system using IEF Client/Server Encyclopedia, the generated delta module 205, as shown at block 405 in FIG. 5, in response to the update request, creates records or entries in the transactions data storage 113 representing the modifications made to the subsetted data as indicated by the associated change status flags.

The generate delta module 205 then copies the transactions data storage 113 on the requesting system 20 to the data model storage 111 on the parent system 10. Then, as shown at block 407, the apply module 207 on the parent system 10 then applies the changes in the transactions data storage 113 on the parent system 10 to the data model storage 111 on the parent system 10. The transactions data storage 113 on the parent system 10 can then be discarded.

As noted earlier, the data included in the data model storage 111 in this embodiment of the present invention are objects, properties of objects and associations between objects. The values of the change status flags associated with an object or with an association between objects indicate that the object or the association has been changed, deleted, unchanged, or added. The values of the change status flags associated with a property of an object indicate that the property has been changed or unchanged.

The update request issued by the user of the requesting system 20 may also include instructions to check in the subsetted data from the data model storage 111 on the requesting system 20 to the data model storage 111 on the parent system 10. If, as shown in FIG. 5 at decision block 409, check in of the subsetted data is requested, the apply module 207 on the parent system 10, as indicated in FIG. 5 at block 411, resets the protection level associated with the subsetted data on the parent system 10 to indicate that the subsetted data is no longer checked out.

In response to the check in request, the apply module 207 on the requesting system 20, as shown at block 413 in FIG. 5, either clears the subsetted data from the data model storage 111 on the requesting system 20 or keeps the subsetted data but resets the protection level associated with the subsetted data to indicate that the subsetted data is checked in. If the protection level associated with the subsetted data in the data model storage 111 on the requesting system 20 indicates that the subsetted data is checked in, the subsetted data cannot be updated to the parent system 10 using the update request.

In a second embodiment of the present invention, the requesting system 20 is a single user workstation which includes the IEF Workstation Toolset.

In another embodiment of the present invention, the requesting system 20 and the parent system 10 are the same system, which includes either the IEF Client/Server Encyclopedia or the IEF Workstation Toolset.

Although the present invention has been described in detail, it should be understood that various changes, substitutions and alterations can be made thereto without departing from the spirit and scope of the present invention as defined by the appended claims.

What is claimed is:

1. A data processing system for providing controlled, multi-tiered checkout of a subset of a first data model to a second data model, said subset on said first data model having an associated first protection level having a first access type, the system comprising:

means for generating said subset of said first data model in accordance with said first protection level in response to a checkout request, said checkout request including a requested protection level;

said generating means further including means for determining, in response to said first protection level and said requested protection level, a second protection level having a second access type associated with said subset;

said generating means further including means for updating said first protection level associated with said first data model in accordance with said second protection level; and means for updating said second data model with said subset and said second protection level and said second access type.

2. A data processing system for providing controlled, multi-tiered access to a first data model, the system comprising:

means responsive to a checkout request and a first protection level have a first access type associated with said first data model for generating a subset of said first data model, for determining a second protection level having a second access type associated with said subset, for updating said first protection level in accordance with said second protection level, and for updating a second data model with said subset and said second protection level associated with said subset;

means for managing access to said subset in accordance with said second protection level and said second access type; and means responsive to an update request for updating said first data model in accordance with said second protection level, said second access type and modifications made to said subset through said managing means.

3. A data processing system for providing controlled, multi-tiered access to a first data model, the system comprising:

means responsive to a checkout request and a first protection level having a first access type associated with said first data model for generating a subset of said first data model, for determining a second protection level having a second access type associated with said subset, and for updating said first protection level in accordance with said second protection level;

means for updating a second data model with said subset and said second protection level associated with said subset;

means for managing access to said subset in said second data model in accordance with said second protection level and said second access type and for indicating modifications to said subset with change status flags associated with said subset in said second data model;

means responsive to said change status flags and an update request for storing said modifications to said subset in a transactions data storage and means responsive to said update request and said transactions data storage for updating said first data model in accordance with said second protection level, said second access type and said modifications in said transactions data storage.

4. A data processing system for providing controlled, multi-tiered access to a first data model, the system comprising:

means responsive to a checkout request and a first protection level having a first access type associated with said first data model for generating a subset of said first data model, for determining a second protection level having a second access type associated with said subset, for updating said first protection level in accordance with said second protection level and said second access type and for copying said subset and said second protection level associated with said subset to a transactions data storage;

means for updating a second data model with said subset, said second protection level and said second access type associated with said subset from said transactions data storage;

means for managing access to said subset in said second data model in accordance with said second protection level and said second access type and for generating entries in said transactions data storage, said entries representing modifications made to said subset;

means responsive to an update request for locating said modifications to said subset in said transactions data storage; and means responsive to said locating means for updating said first data model in accordance with said second protection level and said entries in said transactions data storage.

5. The system of claim 4, wherein said subset generation means further includes means for generating said subset of said first data model in accordance with subset expansion rules.

6. The system of claim 4, wherein said first data model update means further includes means for checking in said subset to said first data model and for modifying said first protection level associated with said first data model in response.

7. The system of claim 6, wherein in said check in means further includes means for deleting said subset from said second data model.

8. The system of claim 6, wherein said check in means further includes means for updating said second protection level associated with said subset in said second data model to indicate that said subset has been checked in.

9. A method, on a general purpose digital computer, of providing controlled, multi-tiered checkout of a subset of a first data model to a second data model, said subset on said first data model having an associated first protection level having a first access type, comprising the steps of:

generating said subset of said first data model in accordance with said first protection level and said first access type in response to a checkout request, said checkout request including a requested protection level;

determining, in response to said first protection level and said requested protection level, a second protection level having a second access type associated with said subset;

updating said first protection level associated with said first data model in accordance with said second protection level; and updating said second data model with said subset and said second protection level and said second access type.

10. A method of providing controlled, multi-tiered access to a first data model, said first data model having an associated first protection level having a first access type, comprising the steps of:

generating a subset of said first data model in accordance with said first protection level and said first access type in response to a checkout request;

determining a second protection level having a second access type associated with said subset;

updating said first protection level associated with said first data model in accordance with said second protection level;

updating a second data model with said subset and said second protection level;

accessing said subset in said second data model in accordance with said second protection level and said second access type; and updating said first data model in accordance with said second protection level said second access type and modifications to said subset in said second data model in said accessing step in response to an update request.

11. A method of providing controlled, multi-tiered access to a first data model, said first data model having an associated first protection level having a first access type, comprising the steps of:

generating a subset of said first data model in accordance with said first protection level and said first access type in response to a checkout request;

determining a second protection level having a second access type associated with said subset;

updating said first protection level associated with said first data model in accordance with said second protection level;

copying said subset and said second protection level associated with said subset to a transactions data storage;

updating a second data model with said subset and said second protection level from said transactions data storage;

accessing said subset in said second data model in accordance with said second protection level and said second access type;

updating change status flags associated with said subset in response to said accessing step;

generating entries in said transactions data storage representing modifications made to said subset in response to an update request; and updating said first data model in accordance with said second protection level and said second access type and said modifications in said transactions data storage in response to said generating step.

12. A method of providing controlled, multi-tiered access to a first data model, said first data model having an associated first protection level having a first access type, comprising the steps of:

generating a subset of said first data model in accordance with said first protection level and said first access type in response to a checkout request;

determining a second protection level and said second access type associated with said subset;

updating said first protection level associated with said first data model in accordance with said second protection level;

copying said subset and said second protection level associated with said subset to a transactions data storage;

updating a second data model with said subset and said second protection level from said transactions data storage;

accessing said subset in said second data model in accordance with said second protection level and said second access type;

updating change status flags associated with said subset in response to said accessing step;

generating entries is said transactions data storage representing modifications made to said subset in response to said accessing step; and updating said first data model in accordance with said second protection level said second access type and said modifications in said transactions data storage in response to an update request.

* * * * *